Dec. 23, 1958
E. HOSTETLER
2,865,328
WATERING TROUGH
Filed Sept. 28, 1955
2 Sheets-Sheet 1
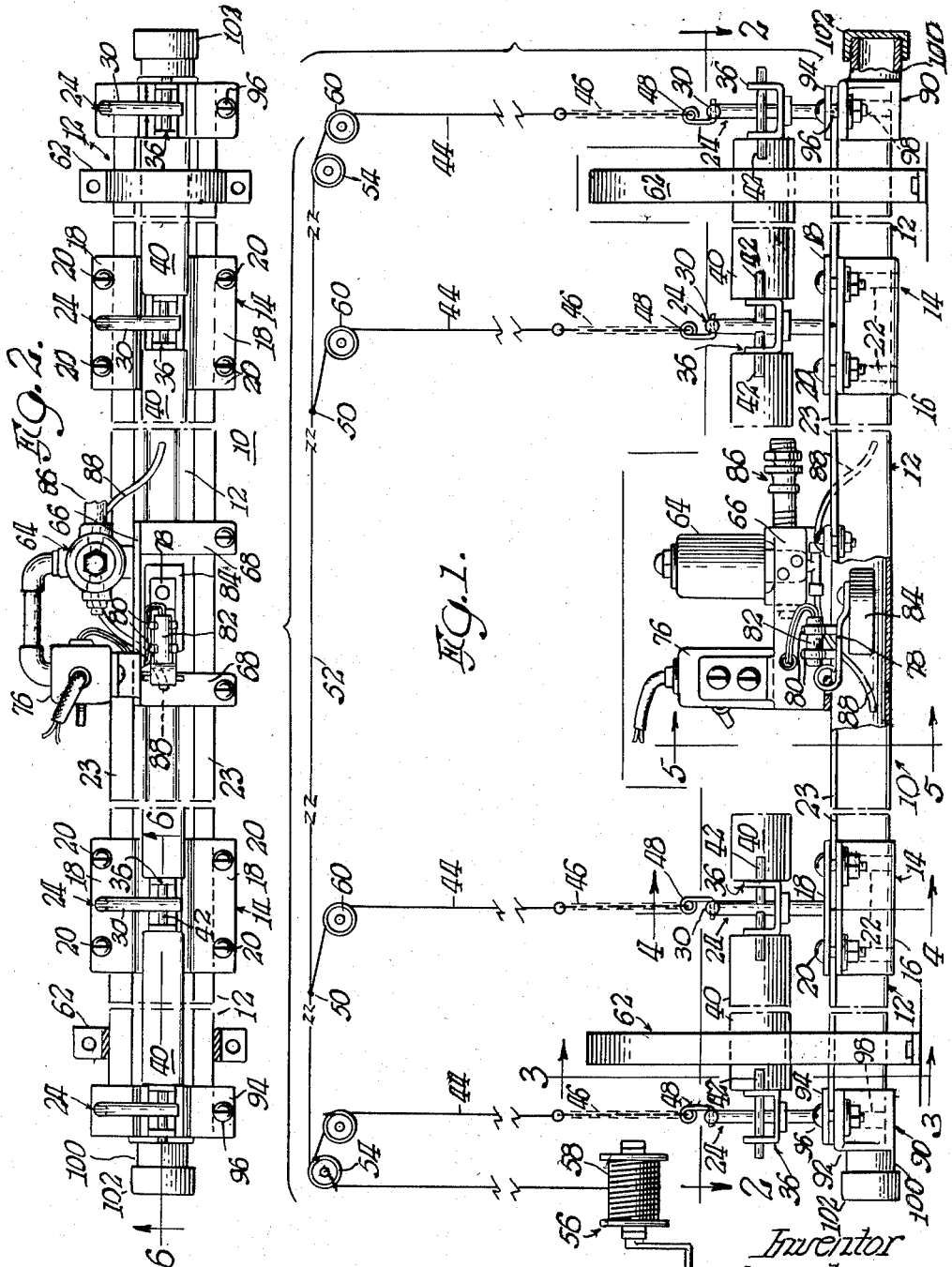
Inventor
Eldon Hostetler

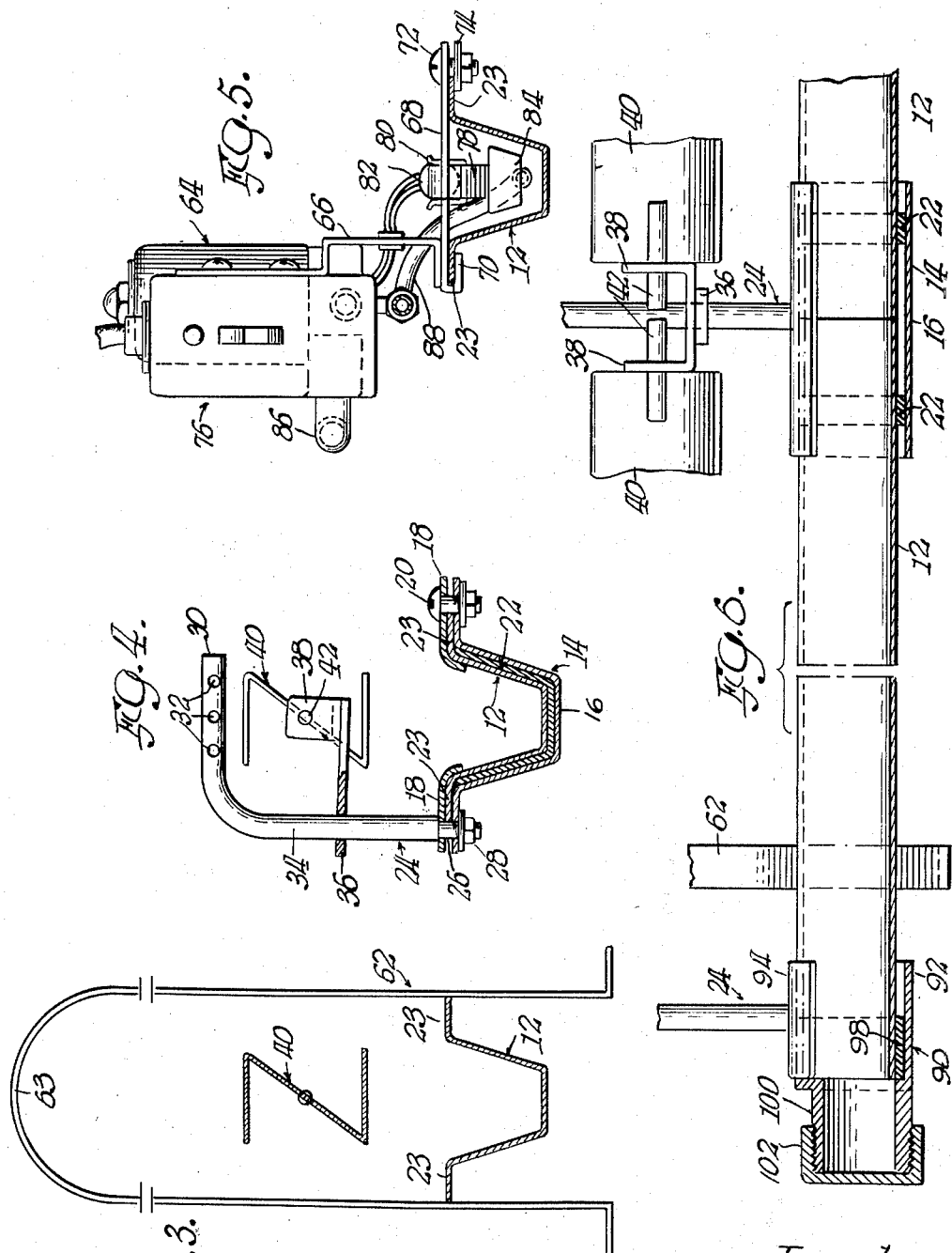

United States Patent Office 2,865,328
Patented Dec. 23, 1958

2,865,328

WATERING TROUGH

Eldon Hostetler, Middlebury, Ind.

Application September 28, 1955, Serial No. 537,191

10 Claims. (Cl. 119—79)

The present invention relates to an improved watering trough construction, and, more particularly, pertains to a readily adjustable watering trough for livestock, such as poultry, which insures the optimum in sanitary conditions and provides maximum trough life.

Previously, watering troughs for poultry were elevated by means of extensible leg members which were formed so as to enable the trough sections to be raised to predetermined heights in desired increments. Thus, the height of the trough was gradually adjustable in accordance with the growth of the fowl.

However, with the employment of fixed leg members many problems of corrosion arise as a result of the acid-like fumes found in poultry houses. The latter fumes resulting from poultry droppings in combination with moisture from the trough itself soon corrode the trough legs, leading to buckling or other failure thereof.

It is an object, therefore, of this invention to provide a suspended water trough which is unaffected by corrosion problems common to troughs employing fixed leg members.

It is another object of this invention to provide a novel watering trough construction which prevents dirt accumulations at trough section junctures.

It is a further object of this invention to provide a water inlet employing a quick-acting valve, for use with a trough, which forces any dirt accumulations in the trough into the end portions thereof in the course of filling, thereby facilitating the cleaning thereof.

It is a still further object of this invention to provide a novel trough construction which is fluidtight at the joints thereof.

Another object of this invention is to provide a readily and easily adjustable trough which is suspended from an overhead support and stabilized against lateral movement.

These and other objects will become more apparent from the following description, accompanying drawings and appended claims.

In one embodiment of the invention, a plurality of sectional watering troughs is provided which are maintained in fluidtight relationship by means of a gasket and clamp connection disposed between adjoining trough sections. Affixed to each of the latter clamp portions is an apertured rod member by means of which adjustable overhead supporting cables may suspend the trough assembly at desired heights above the ground level. The apertured rod members also support bracket members on which are positioned spinner members disposed above the trough which prevent fowl from roosting thereover. An electrically operable quick-acting valve is actuated by a float member positioned in the trough and enables water to enter the trough through twin, oppositely disposed inlets with a velocity which forces any dirt accumulations in the trough to the oppositely disposed end limits thereof. It is thus seen that the provided trough construction assures the utmost in efficiency and cleanliness.

For a more complete understanding of this invention, reference should now be had to the drawings, wherein—

Figure 1 is a fragmentary front elevational view, partly in section, illustrating one embodiment of the invention provided;

Fig. 2 is a fragmentary top plan view taken on line 2—2 of Fig. 1;

Fig. 3 is an enlarged sectional view taken on line 3—3 of Fig. 1;

Fig. 4 is an enlarged sectional view taken on line 4—4 of Fig. 1;

Fig. 5 is an enlarged sectional view, partly in elevation, taken on line 5—5 of Fig. 1; and Fig. 6 is an enlarged fragmentary sectional view taken on line 6—6 of Fig. 2.

Watering trough construction

Referring now to the drawings and more particularly to Fig. 1, a watering trough 10 for live stock and, more particularly, poultry is illustrated comprising a plurality of sections 12 having a substantially U-shaped, cross-sectional configuration, as will be apparent from Figs. 3 to 5, inclusive. The trough sections 12 are preferably fabricated of galvanized or other rust resistant metal, and the end limits of adjoining sections 12 are maintained in abutting relationship in the assembled position by means of a clamp assembly 14.

As will be more clearly noted from Fig. 4, the clamp assembly 14 comprises a cradle member 16 of precisely the same cross-sectional configuration as the trough sections 12 but is fabricated on an enlarged scale thereover so that the trough sections may be positioned in the cradle portion 16 in the manner illustrated in Fig. 4. As will be noted from Fig. 1, the cradle portion 16 is of sufficient length so as to extend for a distance along the outer periphery of each of two adjoining trough sections. In order to maintain the adjoining trough sections in immovable relationship relative to the cradle 16, two strap members 18, clearly shown in Figs. 1, 2 and 4, span the top edge portion of the adjoining trough sections and are clamped in immovable relationship to the cradle member 16 by nut and bolt assemblies 20. The latter assemblies traverse aligned apertures in both the strap members 18 and the cradle members 16. As a result of the clamping action effected by means of the straps 18 and cradle 16 on the abutting edge portions of adjoining trough sections, the latter trough sections are maintained in immovable relationship.

It should be noted that the tight-abutting nature of the joints between adjoining trough sections 12 prevents accumulation of dirt at these points. Furthermore, to insure a fluidtight relationship between the clamping assembly 14 and adjoining trough sections 12, two gasket members 22 are disposed between the outer surface of the trough end portions and the inner surface of the cradle (see Figs. 4 and 6). Thus, when the strap members 18 are compressed against flange portions 23 of the trough sections 12, the gasket members 22, which are preferably composed of resilient material, will be securely compressed assuring a fluidtight seal. It will be noted from Fig. 1 that each of the gasket members 22 is disposed on either side of the juncture between two abutting end portions of adjoining trough sections.

Also connected to each clamp assembly 14 is a rod member 24, best shown in Figs. 4 and 6, having a threaded end portion 26 which traverses aligned apertures disposed in both the strap members 18 and the cradle member 16 and is secured thereto in immovable relationship by means of a nut member 28 which suitably engages the end portion of the rod. An upper end portion 30 of rod 24 is disposed at a right angle to the remainder of the rod and is of such a length so as to traverse the trough width. The rod portion 30 is also suitably apertured at 32, as is clearly shown in Fig. 4, in order to engage a supporting cable, the purpose of which will hereinafter be made apparent.

Slidably engaging a vertical central portion 34 of rod member 24 is a bracket 36. As may be clearly seen in Figs. 1 and 6, each bracket 36 has two projecting lug portions 38, disposed in parallel relationship, which are suitably apertured; said latter apertures being in horizontal alignment. It is the purpose of these bracket members to function as bearings for a rotatable Z-bar 40 shown in Figs. 1, 4, and 6. The rotatable Z-bars are so constructed as to readily rotate should a bird attempt to roost over the trough. It is apparent, from Fig. 4, that the Z-bar is so positioned as to be aligned directly over the center of the trough. The weight of the lug portions 38 of the bracket 36 plus the weight of the Z-bar 40 which is journalled in the bracket lugs 38 by means of pin members 42 causes the bracket member 36 to slant downwardly, whereby the slidable engagement between the bracket 36 and the central portion 34 of the rod member 24 ceases and immovable relationship is created by virtue of the friction existing between the inner periphery of the bracket aperture and the outer periphery of the rod portion 34. It is, of course, obvious that other equivalent securing means, such as screws, etc., may be utilized to effect an immovable relationship between the brackets 36 and the rod members 24.

*Trough supporting means*

It is well known by those experienced in the art of raising poultry that the watering trough must be periodically raised to keep pace with the growth of the fowl. As many as eight different trough elevating operations must be performed in the normal course of raising a chick to maturity. As has been mentioned in the introduction, the use of extensible or adjustable legs for supporting a trough member is subject to many difficulties, namely; corrosion of the legs and, in addition, the work involved in properly adjusting the height of the trough, in accordance with the growth of the fowl, is time consuming and laborious. Utilizing the provided construction herein disclosed, the entire trough construction may be raised readily and efficiently with a minimum of time and effort.

Referring once again to Fig. 4, it will be noted that the apertures 32 are disposed across the width of the trough 10 so that the lateral center of gravity is in vertical alignment with one of the apertures 32. Thus, referring once again to Fig. 1, overhead flexible cables 44 attached at their lower portion to an adjustable chain 46 may support the trough 10 by means of hook members 48 which are affixed to the lower end limit of the chain sections 46. Part of each hook member 48 engages a suitable aperture 32 in vertical alignment with the lateral center of gravity of the trough 10.

The upper end portions of the cables 44 are affixed at 50 by suitable means to a main horizontally disposed main cable 52. The main cable 52 engages pulleys 54 at opposed end portions. Movement of the main cable 52 is effected by rotational movement of a winch 56 or other equivalent means which effects movement of the main cable. It is thus apparent that, when it is desired to raise the trough assembly, the main cable 52 is wound about drum 58 of winch 56. Simultaneously with this winding action of the main cable 52, the cable sections 44 which are suitably clamped to the main cable at point of connection 50 will retract in an upward direction as the main cable 52 moves to the left, as illustrated. Each of the cable sections 44 engages auxiliary pulley members 60, which similarly to pulleys 54 are suitably supported by an overhead rafter or other suitable supporting means, not shown.

It is thus apparent that, as the fowl in the poultry house increase in size, the watering trough 10, which is initially placed on the floor when the birds are chicks, is periodically raised off the ground in predetermined increments which keep pace with the growth of the birds. The raising of the trough which has been previously described is readily accomplished by mere winding of the main cable 52 about the winch 56. It is the purpose of the chain section 46 disposed between cable sections 44 and each hook member 48, to provide that final adjustment which compensates for the differences in cable length, pulley heights, etc.

Although the hook members 48 engage the trough assembly at the center of gravity thereof, whereby the trough remains in a horizontal plane, means must be provided to obviate lateral movement of the trough assembly while suspended above the ground. This latter means comprises guides 62, clearly shown in Fig. 3, which slidably engage opposite edge portions of the trough flanges 23. The guides 62 which are disposed at either end limit of the trough assembly, as illustrated in Fig. 1, are of such a height so as to enable the trough to be elevated to its maximum height without having any portion thereof abut against a bight portion 63 of the guide. It will be obvious from Fig. 3 that the slidable engagement between trough 10 and the opposite legs of the guide 62 obviates any lateral movement therebetween, and, thus, enables the trough 10 to be positioned above the ground in a stable manner without vibrating.

*Quick-acting trough valve*

The valve means utilized in conjunction with the above-described trough 10 comprises a solenoid valve 64, see Figs. 1, 2 and 5, which is bolted or otherwise fixedly secured to a detachable bracket 66 which has formed integrally therewith arm members 68. The bracket 66 has a U-shaped end limit 70, as illustrated in Fig. 5 which engages one flange edge 23 of a trough section 12. The arm members 68 formed integral with the bracket member 66 traverse the trough and are clamped to an opposite trough edge 23 by means of a nut and bolt assembly 72 which clamp a trough edge 23 between the undersurface of the distal end portion of the arm member 68 and a washer member 74. It is thus seen that the bracket 66 and all the elements affixed thereto are detachably mounted on any portion of the trough 10. Referring again to Fig. 1, it will be noted that a switch member 76 which controls the electrical energization of the solenoid valve 64 is also bolted to the bracket member 66.

Pivotally mounted on one of the arm members 68 is a strap 78 (see Fig. 1). The latter strap has formed integrally therewith or affixed thereto by suitable means clamping members 80 which engage in immovable relationship a mercury switch member 82. Since both the solenoid valve 14 and the mercury switch 82 are conventional types, details of construction are not illustrated. A float member 84 comprising styrofoam or other suitable light density material which is resistant to water logging is suitably affixed to the end portion of the strap 78. It is thus apparent that the float 84 will rise or fall with the water level in the trough. In the course of the latter pivotal movement, mercury switch 82 will similarly pivotally move. Upon the water in the trough 10 reaching a minimum level, the styrofoam float 84 will pivot downwardly and the switch 82 will similarly pivot in a downward direction. In such a position, which corresponds to a minimum water level in the trough, the switch 82 will close a circuit energizing and opening the solenoid valve 64. The latter valve is interposed between a source of water, which is conveyed thereto by means of a conduit 86, and two opposed fluid outlets 88, more clearly seen in Fig. 2, through which water emerges in the course of filling up the trough. It will be noted from Fig. 2 that the end limits of the water outlets 88 are disposed parallel to the longitudinal axis of the trough. The water emerging therethrough is at such a pressure and velocity so as to force all dirt or foreign matter, which has accumulated in the trough, to the end portions thereof. It is thus apparent that it is desirable that the detachably mountable bracket member 66 be positioned at the center portion of the trough 10. Thus, the force of the water emerging through fluid outlets 88 may be equally divided over the two trough halves.

It is obvious that, as the water level in the trough rises, the styrofoam float 84 will once more pivot in an upward direction until the mercury switch 82 breaks the circuit energizing the solenoid valves 64, thereby closing the same. At a predetermined maximum water level in the trough, the solenoid valve 64 will close.

Trough clean-out openings

An added feature of convenience incorporated in the illustrated watering trough comprises the end portions 90 which form the end walls for the trough member 10. As will be noted from Fig. 2, the wall portions 90 are clamped to either free end limit of the trough 10 in a manner similar to the cradle end strap engagement of the end portions of two adjoining trough sections. It will be noted from Fig. 1 that wall member 92 receives the free end portion of the trough 10 and is clamped thereto by means of an apertured strap 94 which is centrally apertured, as is the underlying flange edge portion of the wall member 92. Thus, a bolt and nut assembly 96 is enabled to traverse both the strap 94 and the flange edge of wall 92 and clamp the latter two members to the free end limit of the trough section. To enable a fluid seal to be effected between the end wall portions 90 and either free end limit of the trough 10, gasket members 98 are disposed therebetween, as illustrated in Figs. 1 and 6.

The end limit of either wall portion 90 has formed integral therewith a nipple member 100 which is adapted to threadedly engage in fluid-sealing engagement cap member 102. The cap members 102 facilitate the cleaning of the trough 10 by being readily removable from the nipple portions 100. Should cleaning of the trough be desirable, cap members 102 are removed; any water present in the trough will drain therethrough, since the nipples are disposed in the lower portions of the trough walls 92, causing the styrofoam float 84 to drop, thereby opening solenoid valve 64. Water will then emerge from either fluid outlet 88 forcing all foreign matter and dirt in the various trough sections to move to the end of the trough, whereupon it will flow out the open nipple portions 100 into a suitable container. It is thus apparent that cleaning of the illustrated trough construction may be carried out without scraping or otherwise contacting the inner trough surface.

It is evident that an improved trough construction has been provided which is readily adjustable in conforming with the size of growing poultry. It is further apparent that the provided trough construction assures optimum sanitary conditions, thereby enhancing the health and safety of the fowl to which water is supplied thereby. As a result of the nipple and cap construction formed integral with the end wall portions of the trough construction and the solenoid valve member having the opposed fluid outlets, cleaning of the trough may be carried out in a ready manner with ease and efficiency.

I claim:

1. In combination with a watering trough, clamping means engaging outer peripheral surface portions of said trough and immovably secured thereto, coupling means bolted to an edge flange portion of said trough and said clamping means, said coupling means having a distal end portion disposed over the width of said trough, said coupling means distal end portion being apertured at predetermined intervals and spaced from said underlying trough portions whereby ready access may be had to said trough interior for cleaning purposes, regulatable overhead suspension means adapted to support said trough, and hook means attached to the depending distal end limit of said suspension means, said hook means being adapted to engage said coupling means apertures.

2. In combination, a plurality of longitudinally aligned trough sections of uniform cross-sectional configuration, the longitudinal end limits of adjoining trough sections being in normal abutting relationship, frictional clamping means affixed to and maintaining adjoining trough sections in relatively immovable relationship, quick-acting valve means supported by said clamping means regulating the supply of water to said trough sections, pivotally movable float supported switch means sensitive to the water level in said trough actuating said valve means, gasket means disposed on the undersurface of adjoining trough sections maintaining the juncture between adjoining sections in fluidtight condition, overlying attaching means affixed to said frictional clamping means and having a portion thereof disposed in spaced-apart relationship with the top surface of said trough enabling said trough sections to be supported from above thereby, overlying trough support means, suspension means engaging said support means and said trough attaching means suspending said trough at predetermined distances from said support means, wall portions defining the opposed end limits of said trough and removable plug means insertable in said wall lowermost portions.

3. In combination, a watering trough having opposed end walls, a quick-acting valve, detachable bracket means securing said quick-acting valve to said trough, conduit means connecting a source of fluid supply with said quick-acting valve, float means pivotally mounted on said bracket means and disposed in said trough, switch means regulating said valve positioned on said float means, said switch means being actuated into valve closing and valve opening positions during pivotal movement of said float means, twin conduit portions having outlets means affixed to said valve and disposed in opposed directions coaxial with the longitudinal axis of said trough and removable closure members positioned in each of said opposed end walls of said trough.

4. In combination, a watering trough composed of a plurality of trough sections, clamping means maintaining said sections in longitudinal alignment, abutting portions of adjacent trough sections being substantially coplanar whereby a smooth continuous inside trough surface is effected, quick-acting valve means regulating the admission of water to said trough, opposed twin conduit portions in communication with said quick-acting valve means disposed in said trough and having outlets disposed toward opposed ends of said trough whereby water may wash all foreign material disposed in said trough toward opposed ends thereof when said quick-acting valve is in the open position.

5. In combination with an elongated trough for delivering fluid material for animal consumption, a supply conduit, a jet conduit having an end portion within said trough and directed longitudinally thereof, the other end of said jet conduit being connected to said supply conduit, a quick-acting full-flow valve between said conduits and a control means in said trough and having connection with said valve whereby, when the fluid in said trough becomes low, the valve will be activated to cause a quick full flow of fluid into said trough.

6. The combination as recited in claim 5 in combination with a plurality of adjustable suspension means which are affixed to said trough and an overhead support whereby said trough may be adjusted relative to said overhead support.

7. The combination as recited in claim 6 in combination with means for uniformly and simultaneously adjusting the length of all of said suspension means whereby said trough may be readily adjusted relative to said overhead support.

8. The combination as recited in claim 5 in which said trough is composed of a plurality of sections arranged in end-to-end abutting relation, said trough sections defining a smooth continuous internal trough surface.

9. The combination as recited in claim 5 in which fluid outlets and removable closure members therefor are disposed in opposed end portions of said trough.

10. In combination with an elongated trough for delivering fluid material for animal consumption, a supply conduit, a conduit having an end portion in discharging relationship with said trough and producing at least one jet directed longitudinally of said trough, the other end of said conduit being connected to said supply conduit, a quick-acting full-flow valve between said conduits and a control means in said trough and having connection with said valve whereby, when the fluid in said trough becomes low, the valve will be activated to cause a quick full flow of fluid into said trough.

References Cited in the file of this patent

UNITED STATES PATENTS

| | | |
|---|---|---|
| 1,094,960 | Andersson | Apr. 28, 1914 |
| 1,201,904 | Winters et al. | Oct. 17, 1916 |
| 1,896,096 | Parker | Feb. 7, 1933 |
| 2,626,724 | Smallegan | Jan. 27, 1953 |
| 2,703,099 | Smallegan | Mar. 1, 1955 |
| 2,738,766 | Hart | Mar. 20, 1956 |

FOREIGN PATENTS

| | | |
|---|---|---|
| 645,564 | Great Britain | Nov. 1, 1950 |